United States Patent [19]

Kent

[11] Patent Number: 5,294,224
[45] Date of Patent: Mar. 15, 1994

[54] C-SHAPED FASTENING CLIP WITH IMPROVED STRENGTH

[75] Inventor: Scott E. Kent, Albion, N.Y.

[73] Assignee: General Motors Corporation, Detroit, Mich.

[21] Appl. No.: 106,747

[22] Filed: Aug. 16, 1993

[51] Int. Cl.⁵ .................. F16B 37/02; F16B 37/04; F16B 37/16
[52] U.S. Cl. ......................... 411/174; 411/437; 411/526
[58] Field of Search ............. 411/174, 175, 324, 433, 411/437, 525–528, 512

[56] References Cited

U.S. PATENT DOCUMENTS

| | | |
|---|---|---|
| 2,062,685 | 12/1936 | Tinnerman . |
| 2,233,230 | 2/1941 | Tinnerman . |
| 2,287,180 | 6/1942 | Kost ........................... 411/175 |
| 3,358,729 | 12/1967 | Munse . |
| 3,414,035 | 12/1968 | Munse ......................... 411/175 |
| 3,669,170 | 6/1972 | Schuster ...................... 411/175 |
| 4,647,263 | 3/1987 | Macfee, Jr. et al. ............ 411/82 |
| 4,826,375 | 5/1989 | Holton ........................ 411/174 |
| 4,883,397 | 11/1989 | Dubost ........................ 411/174 |

FOREIGN PATENT DOCUMENTS 3938547  5/1991  Fed. Rep. of Germany .

*Primary Examiner*—Neill R. Wilson
*Attorney, Agent, or Firm*—Patrick M. Griffin

[57] ABSTRACT

An improved fastening clip of the U- or C-shaped type has a thread engaging hole in the axially opposed clip wall with a novel hole form. The perimeter surface of the hole includes a cooperating conical rim and pair of strengthening corrugations that work together to lead the fastener tip into the hole, as well as to strengthen and stiffen the surface. The corrugations also provide thread engaging bight portions close to the plane of the axially opposed clip wall, providing added fastening security with a relatively short fastener.

3 Claims, 1 Drawing Sheet

C-SHAPED FASTENING CLIP WITH IMPROVED STRENGTH

This invention relates to a C-shaped fastening clip of the type having a pair of opposed walls that are biased toward one another by the head and tip of a threaded fastener respectively, and specifically to a novel configuration for the perimeter surface of the wall hole that is engaged by the fastener tip.

BACKGROUND OF THE INVENTION

Fastening clips of the type referred to above, which are sometimes called U-shaped or C-shaped, may be small, separable clips attached to a larger structure, or an integral part of a larger structure that is fastened to something else. I either case, each type has a pair of axially opposed walls joined by a generally perpendicular wall, hence the C- or U-shape. The threaded fastener has a head and tip, with threads, and often a predetermined length that can't be exceeded in the particular application. The fastener passes freely through a first wall, which is ultimately abutted, directly or indirectly, with the fastener head, and the tip passes through a hole in the opposed second wall, the edge of which is engaged by the side threads. This action tends to pinch or bias the walls toward one another as the fastener is tightened. The security or strength of the fastening achieved depends on how well and how securely the side threads of the fastener engage the hole in the second wall.

Prior art clips of the type referred to above often alter the perimeter area around the hole in the second wall to try to improve the fastener operation. Specifically, the perimeter is often formed into a dimpled or conical shape so as to funnel the fastener tip toward the hole edge. This also has the effect of moving the hole edge away from and out of the plane of the second wall, however. If there is a limitation on how long the fastener can be, then the edge of the hole may end up engaging fewer threads, the ones nearer the tip which may be smaller and less effective. Another common technique is to lance or split the thread engaging edge of the hole, which is displaced in opposite axial directions, creating separate edge portions to contact more threads of the fastener. This has two less than desirable effects. 20 The edge is weakened by being split in two, and an asymmetry is created at the split which causes the threaded fastener to pull in unevenly as it is tightened.

SUMMARY OF THE INVENTION

The invention provides a clip of the general type described above that has improved fastening strength and security, without the drawbacks of the prior art approaches. The perimeter surface of the hole that the fastener tip engages is configured with a generally conical rim that slopes down to a semi-circular edge. The semi-circular edges is thereby spaced away from and out of the plane of the second wall. The remainder of the perimeter surface, however, is configured as a pair of radially opposed strengthening corrugations. Each corrugation has a generally inverted U-shape, as does its edge, and the top or bight portion of that edge is still generally coplanar to the second wall.

The various elements of the perimeter surface so configured cooperate to achieve several advantages. The conical rim provides a lead in or funneling effect for the fastener tip, correcting for any initial misalignment. In addition, should the fastener tip hit either corrugation, it will still be funneled into the conical rim. Once the tip reaches the semi-circular edge, the more effective threads farther up the fastener can engage the two corrugation bight portions. This is achieved without lengthening the threaded fastener, since the bight portions are still basically in the plane of the second wall. Furthermore, the provision of the extra thread engaging edge is achieved without weakening the clip, since all the edge portions are continuous to one another, with no splits or discontinuities. Moreover, the strengthening corrugations actually reinforce the perimeter surface around the hole, as their name implies. In the embodiment disclosed, the provision of two, symmetrical corrugations, radially opposed, also causes the fastener to pull more evenly in on the second wall as it is tightened.

DESCRIPTION OF THE PREFERRED EMBODIMENT

These and other advantages and features of the invention will appear from the following written description and the drawings, in which.

Figure 1:
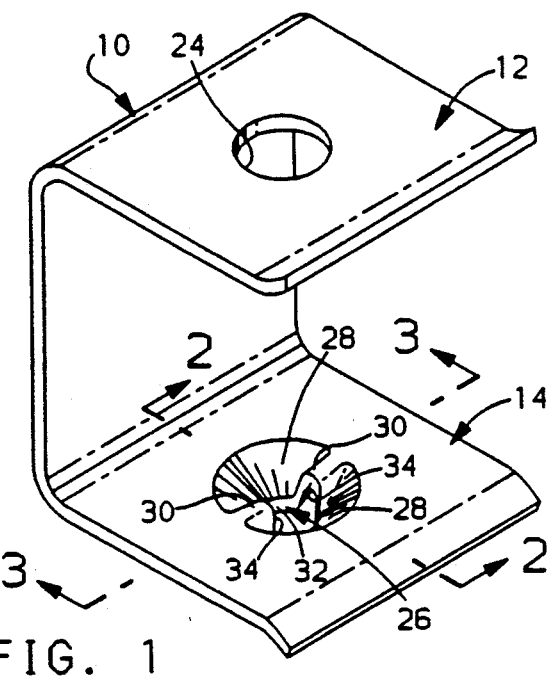
FIG. 1 is a perspective view of a fastening clip according to the invention.
Figure 5:
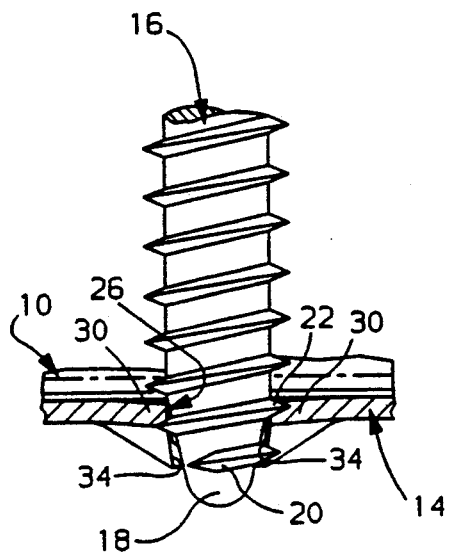
FIG. 5 is a view like FIG. 3 showing the final, tightened position of the fastener.

Referring first to FIGS. 1 and 5, a preferred embodiment of a fastening clip according to the invention is indicated generally at (10). Clip (10) has a first planar wall (12), a second planar wall (14) axially opposed, and is generally square in cross section. It should be kept in mind that while clip (10) is shown as a single, discrete part, it could in fact be part of a long channel in which several similar structures were embodied. Clip (10) is designed to interact with a conventional threaded fastener, indicated generally at (16). Fastener (16) has a head, not illustrated, and a sharper, smaller tip (18) from which a thread form begins, creating smaller diameter tip threads (20) and larger side threads (22) located axially farther up from the tip (18). Of course, a single thread form creates both. In many applications, there is a limit to how long fastener (16) can be. Stated differently, there is a practical limit to how far tip (18) is allowed to extend through the second, lower wall (14), because of clearance limitations. The invention works within that limitation.

Referring next to FIGS. 1, upper wall (12) has a simple round hole (24) large enough to pass fastener (16) freely, but small enough that the head of fastener (16) will abut it when tightened, either directly or indirectly. Directly axially opposed to upper hole (24) is a hole (26) that has a perimeter surface comprised of two basic features, a concave (as viewed from above lower wall (14) conical rim (28) and two diametrically opposed, convex reinforcing corrugations (30). The corrugations (30) divide the rim (28), without interrupting or cutting it, in two. The perimeter surface of hole (26) is, in general, formed by a two-part die or tool, not illustrated, each half of which is pressed together from above and below into lower wall (14) after lower hole (26) is drilled. While the material of lower wall (14) is thinned out somewhat in this forming process, it is again important to note that is not lanced or cut at any point.

Figure 2:
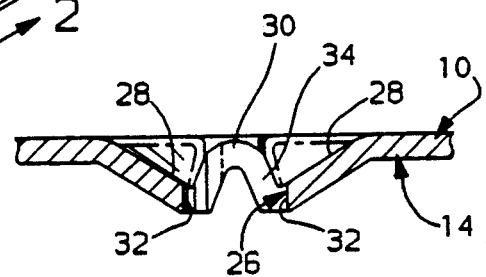
FIG. 2 is a sectional view taken along the line 2—2 of FIG. 1.
Figure 3:
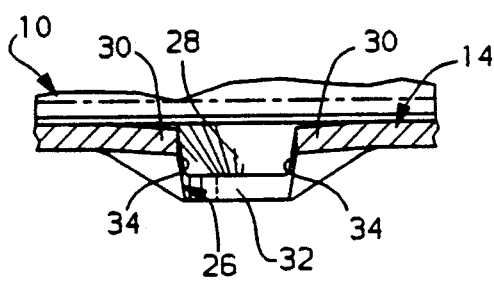
FIG. 3 is a sectional taken along the line 3—3 of FIG. 1.

Referring next to FIGS. 2 and 3, more detail is illustrated. The conical rim (28) slopes down to a semi-circular edge (32), which lies on a circle that is parallel to and axially spaced from the underside of lower wall (14). Each strengthening corrugation (30) has a sharp, inverted U-shape, with steeply sloped sides that slope down to and blend continuously into the rim (28). The U-shaped corrugations (30) provide a pair of similarly shaped edges which, in general, blend into the semi-circular edge (32) to create one, rippled or scalloped edge. A pair of edge bight portions (34) are created that lie close to, almost in, the plane of lower wall (14). The perimeter surface formed is, overall, symmetrical and smooth, and, most importantly, continuous and uninterrupted. The rippled corrugated effect created serves to strengthen and stiffen the whole perimeter surface, as opposed to a broken or split surface.

Figure 4:
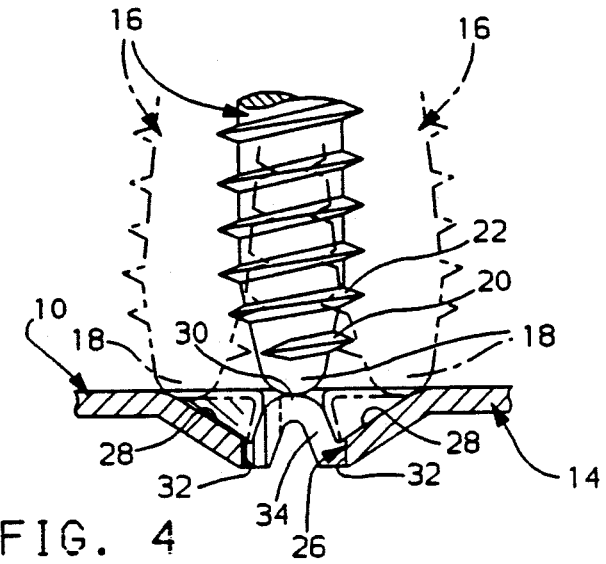
FIG. 4 is a view like FIG. 2 showing the possible positions in which the tip of a fastener can initially engage.

Referring next to FIGS. 4 and 5, the operation of the invention is illustrated. After passing through upper hole (24), the fastener tip (18) may directly enter lower hole (26). It is more likely, however, that it will cock into any one of several positions off axis, as shown by the dotted lines in FIG. 4, and hit either the top of a corrugation (30), or the conical rim (28). If the former, then the tip (18) will slide down to the rim (28), and eventually into lower hole (26). So the funneling, lead in effect of rim (28) is not interfered with, and in fact is assisted by, the steep sides of the corrugations (30). There are no cracks or splits in which the tip (18) could potentially catch or be hung up. Once the tip (18) is led into lower hole (26) and is turned and tightened, the tip threads (20) can engage the semi-circular edge (32). Again, being smaller in diameter, the tip threads (20) do not potentially engage or bite as tightly as the larger diameter side threads (22). These, however, are now able to engage the bight portions (34), which are close to the plane of lower wall (14), as best illustrated in FIG. 5. This extra thread engaging capability can provide a significantly stronger and more secure connection, with a fastener (16) that is relatively short. Furthermore, in the embodiment disclosed, the provision of two edge bight portions (34) diametrically opposed to one another allows the fastener (16) to pull up or in on lower wall (14) more evenly, biasing the walls (12) and (14) together. In conclusion, a high degree of cooperation among the features of the perimeter surface described leads to a stronger and stiffer surface, improved lead in of the fastener, and improved thread engagement and fastener security.

Variations in the embodiment disclosed could be made. For example, more or fewer corrugations (30) could be provided, such as one or three. It is advantageous that they be evenly and symmetrically spaced, however. Therefore, it will be understood that it is not intended to limit the scope of the invention to just the embodiment disclosed.

The embodiments of the invention in which an exclusive property or privilege are claimed are defined as follows:

1. In a C-shaped fastening clip of the type having a first wall through which a threaded fastener having a tip and threads passes and an axially opposed, generally planar second wall through which the tip of the fastener extends and into which the threads of the fastener are threadably engaged to draw the two walls toward one another, the improvement comprising:

a hole through the second wall comprising a formed perimeter surface having a generally conical rim sloping down from the second wall to a semi-circular edge spaced from the second wall and also comprising at least one reinforcing corrugation in the conical rim having a generally inverted U-shaped edge continuous with the semi-circular edge and including a bight portion substantially coplanar to the second wall, whereby, when the threaded fastener tip contacts either the corrugation or conical rim, it is thereby funneled toward the circular edge, with threads thereof engaging both the circular edge and the corrugation bight portion so as to bias the walls toward one another.

2. In a C-shaped fastening clip of the type having a first wall through which a threaded fastener having a tip and side threads passes and an axially opposed, generally planar second wall through which the tip of the fastener extends and into which the threads of the fastener are threadably engaged to draw the two walls toward one another, the improvement comprising:

a hole through the second wall comprising a formed perimeter surface having a generally conical rim sloping down from the second wall to a semi-circular edge spaced from the second wall and also comprising two radially opposed reinforcing corrugations in the conical rim each having a generally inverted U-shaped edge continuous with the semi-circular edge and including a bight portion substantially coplanar to the second wall, whereby, when the threaded fastener tip contacts either the corrugation or conical rim, it is thereby funneled toward the circular edge, with threads thereof engaging both the circular edge and the corrugation bight portions so as to pull evenly on the perimeter surface of the second wall hole bias the walls toward one another.

3. A C-shaped fastening clip, comprising:

a first wall through which a threaded fastener having a tip and side threads passes, an axially opposed, generally planar second wall through which the tip of the fastener extends and into which the threads of the fastener are threadably engaged to draw the two walls toward one another, the second wall further including a hole therethrough having a formed perimeter surface with a generally conical rim sloping down from the second wall to a semi-circular edge spaced from the second wall and also comprising two radially opposed reinforcing corrugations in the conical rim each having a generally inverted U-shaped edge continuous with the semi-circular edge and including a bight portion substantially coplanar to the second wall, whereby, when the threaded fastener tip contacts either the corrugation or conical rim, it is thereby funneled toward the circular edge, with threads thereof engaging both the circular edge and the corrugation bight portions so as to pull evenly on the perimeter surface of the second wall hole bias the walls toward one another.

* * * * *